United States Patent
Hernandez et al.

(10) Patent No.: US 12,469,496 B2
(45) Date of Patent: Nov. 11, 2025

(54) HYBRID LOCAL AND GLOBAL PROCESSING OF VOICE REQUESTS FROM USERS

(71) Applicant: Dell Products L.P., Round Rock, TX (US)

(72) Inventors: Robert C. Hernandez, Morrisville, NC (US); Uboho Victor, San Antonio, TX (US)

(73) Assignee: Dell Products L.P., Round Rock, TX (US)

( * ) Notice: Subject to any disclaimer, the term of this patent is extended or adjusted under 35 U.S.C. 154(b) by 435 days.

(21) Appl. No.: 18/065,843

(22) Filed: Dec. 14, 2022

(65) Prior Publication Data

US 2024/0203420 A1    Jun. 20, 2024

(51) Int. Cl.
*G10L 17/22*    (2013.01)
*G10L 15/18*    (2013.01)
*G10L 15/30*    (2013.01)

(52) U.S. Cl.
CPC .............. *G10L 15/30* (2013.01); *G10L 15/18* (2013.01)

(58) Field of Classification Search
USPC ............ 704/1–275; 706/1–62; 715/716–811, 715/254–256; 382/128–159
See application file for complete search history.

(56) References Cited

U.S. PATENT DOCUMENTS

| | | | |
|---|---|---|---|
| 10,811,013 B1* | 10/2020 | Secker-Walker | ... G10L 15/1822 |
| 11,398,226 B1* | 7/2022 | Wang | ................... G10L 15/1822 |
| 2015/0142447 A1* | 5/2015 | Kennewick | ............. G10L 15/24 704/275 |
| 2017/0249309 A1* | 8/2017 | Sarikaya | ............. G06Q 10/1093 |
| 2018/0232662 A1* | 8/2018 | Solomon | ................ H04R 3/005 |
| 2019/0279106 A1* | 9/2019 | Yadav | ...................... G10L 15/22 |

OTHER PUBLICATIONS

Viehweider Alexander; Intention Detection Device, Intention Detection Method Computer-Readable Storage Medium; 2021 (Year: 2021).*

* cited by examiner

*Primary Examiner* — Marcellus J Augustin
(74) *Attorney, Agent, or Firm* — Norton Rose Fulbright US LLP

(57) ABSTRACT

Systems and methods described herein may provide a system that enables hybrid local and global processing of voice requests from a user. A computing device may receive audio data containing a voice request from a user and may determine, using a local intent engine, a local intent prediction based on the voice request. The computing device may determine that the local intent prediction has a confidence measure that is less than a predetermined threshold and may, in response, transmit data containing the voice request to a global intent engine. The computing device may receive a global intent prediction from the global intent engine and may determine a corresponding computing process based on the global intent prediction.

14 Claims, 9 Drawing Sheets

HYBRID LOCAL AND GLOBAL PROCESSING OF VOICE REQUESTS FROM USERS

FIELD OF THE DISCLOSURE

The instant disclosure relates to information handling systems. More specifically, portions of this disclosure relate to processing voice requests received from users.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications, productivity applications, and the like. Aspects of embodiments of this disclosure include utilizing a hybrid local and global system for receiving and processing voice requests from a user. In particular, a computing device (e.g., a local computing device) may receive audio data containing a voice request from a user and may use a local intent engine to generate a local intent prediction of a user intent indicated by the voice request. If a confidence measure for the local intent prediction exceeds a corresponding threshold, a computing process associated with the predicted intent may be identified and executed by the computing device. If not, the computing device may utilize a global intent engine, which may execute on another computing device (e.g., an external or non-local computing device) to determine a global intent prediction. If a confidence measure for the global intent prediction exceeds a corresponding threshold, a computing process associated with the predicted intent may be identified and executed by the computing device. If not, the computing device may request additional input from the user, which may be used to identify and execute a requested computing process and may further be used to update one or both of the local intent engine and the global intent engine.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

According to one embodiment, a method for execution by an information handling system, such as a hub device, includes receiving, at a first computing device, audio data containing a voice request from a user; determining, using a local intent engine executing on the first computing device, a local intent prediction based on the voice request; determining that a first confidence measure for the local intent prediction is less than a predetermined threshold; transmitting data containing the voice request to a global intent engine executing on a second computing device; receiving, from the global intent engine, a global intent prediction based on the voice request; determining, based on the global intent prediction, a corresponding computing process; and executing the corresponding computing process.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified, and includes what is specified (e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
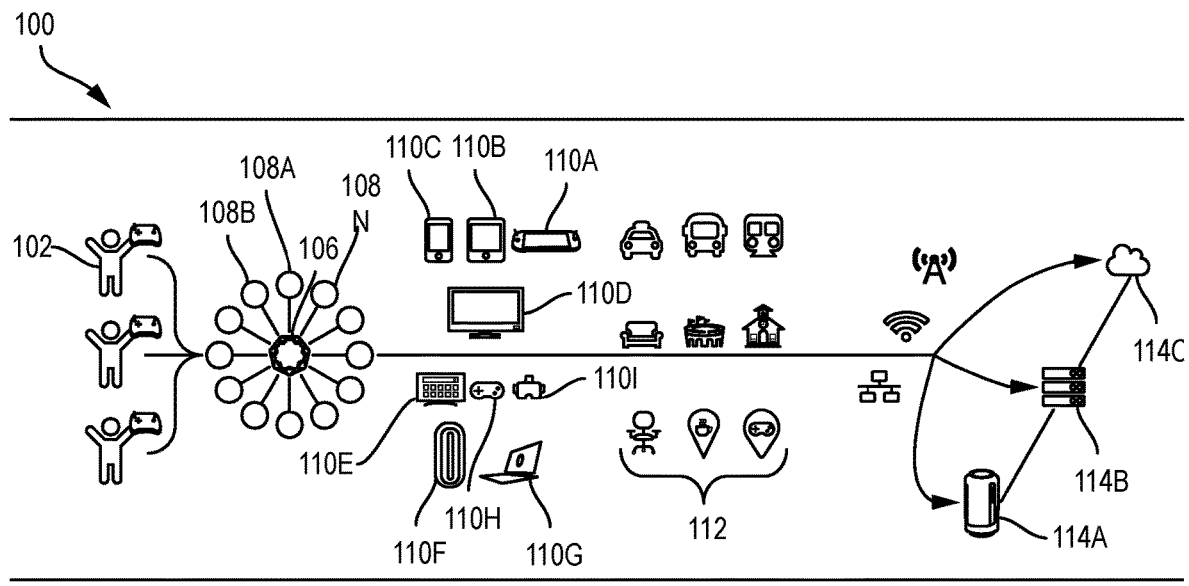
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session) and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., hub devices and personal computers).

The user's home may be divided into different environments defined by a space around a host device. For example, a living room with a television may be one environment, and a bedroom with a personal computer may be another environment. A user may use a peripheral device in one of the environments, and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the communication link from the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming, and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game or other application requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application sessions for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen, and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, or VR headset 110I. The devices 110 may access services at any of locations 112, including cars, buses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
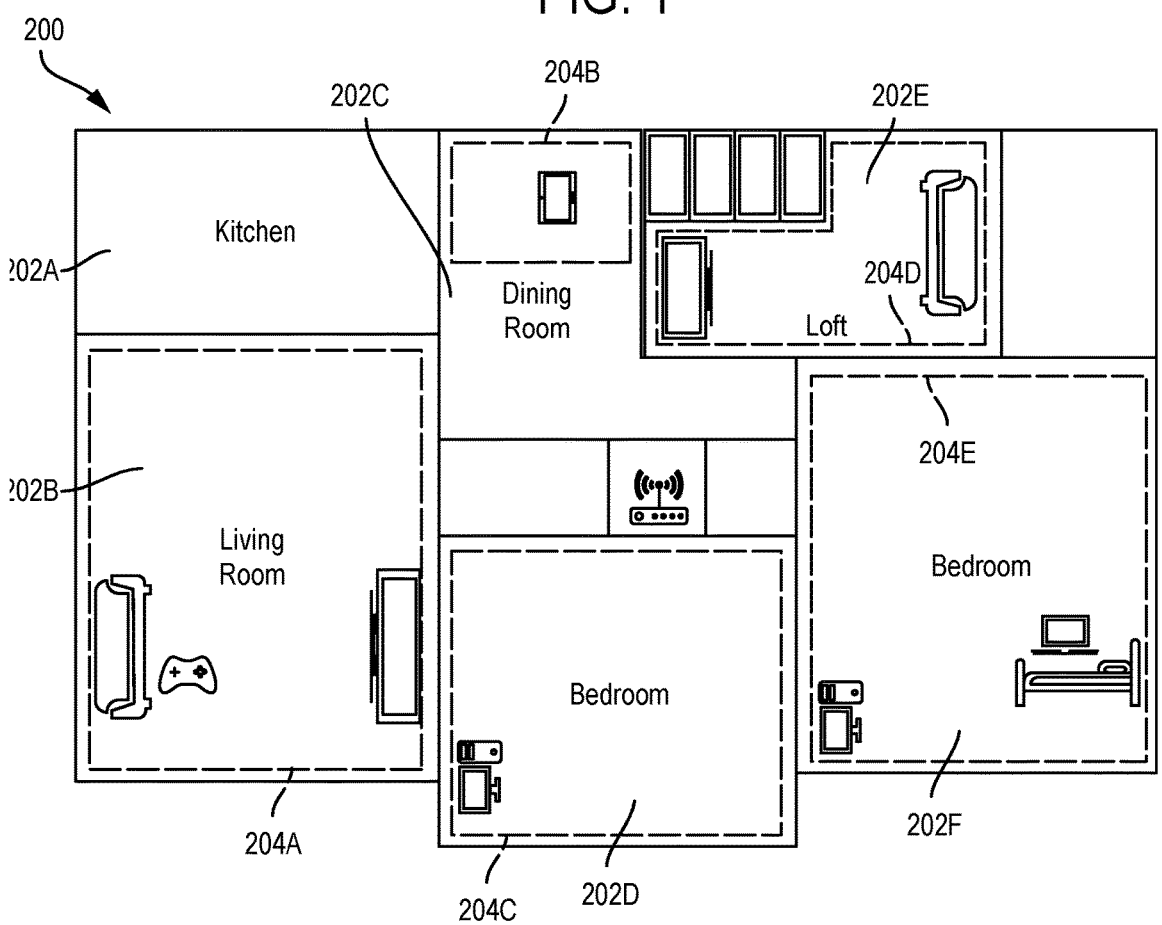
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, an application or other computing services manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
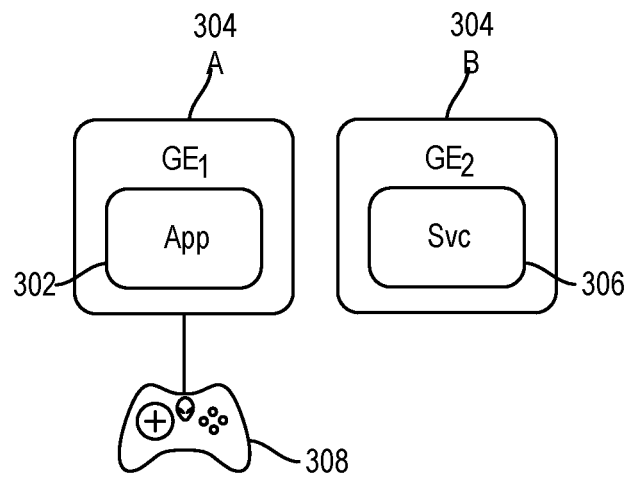
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
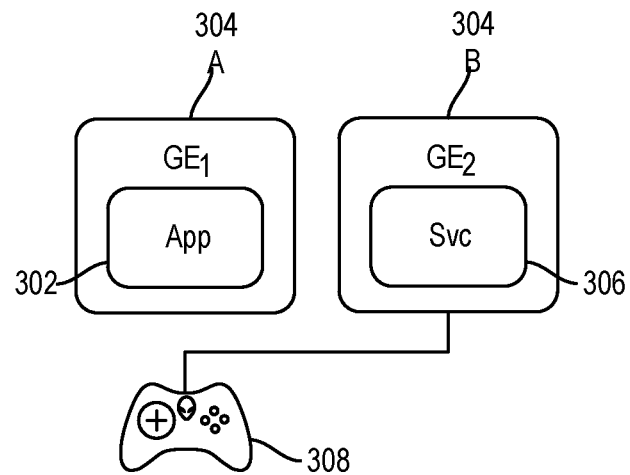
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
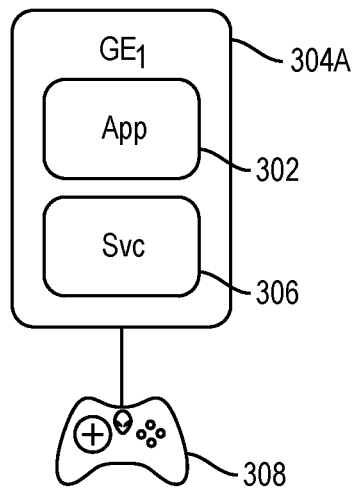
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
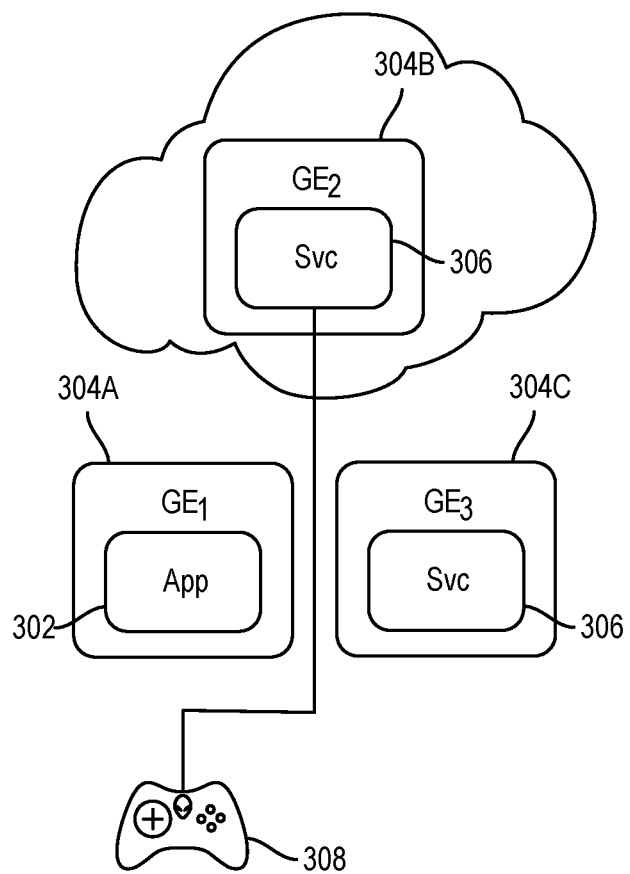
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
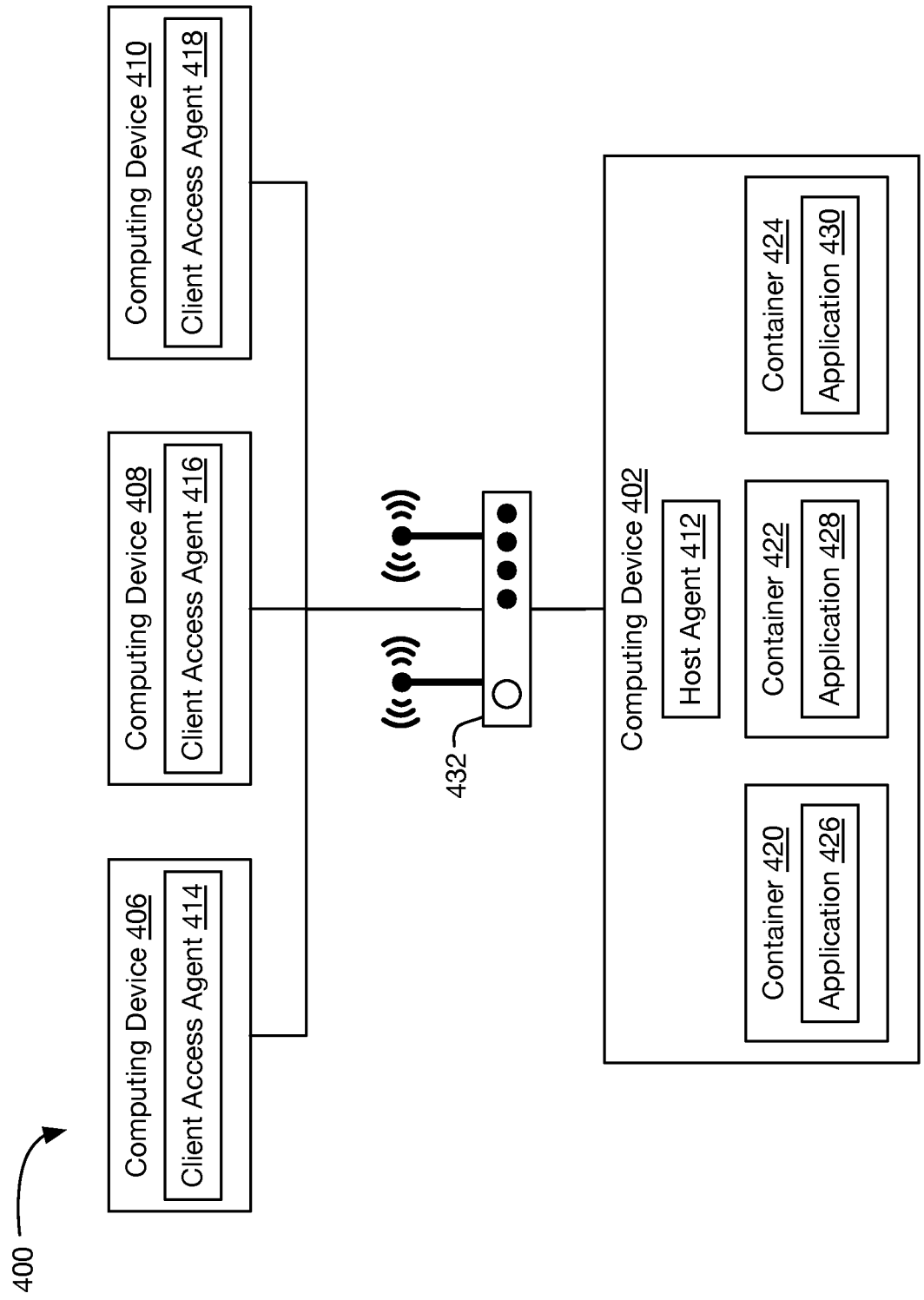
FIG. 4 is a block diagram of a system according to an exemplary embodiment of the present disclosure.

FIG. 4 is a block diagram of a system 400 according to an exemplary embodiment of the present disclosure. The system 400 includes an access point 432 and computing device 402, 406, 408, 410. The system 400 may be configured to provision one or more gaming environments or other computing services to the computing device 406, 408, 410. In particular, the access point 432 may implement a network and the system 400 may be configured to provision various computing services to computing devices 406, 408, 410 connected to the network. The network may be implemented within a particular physical location. For example, the network may be implemented within a physical premises, such as a home, an office, or other facility. In certain instances, the network may be implemented as a local network (e.g., a local area network), a virtual private network, L1, and/or a global network (e.g., the Internet).

The computing devices 402, 404, 406, 408 may be communicatively coupled to the network. For example, the computing devices 402, 404, 406, 408 may communicate with the network using one or more wired network interfaces (e.g., Ethernet interfaces) and/or wireless network interfaces (e.g., Wi-Fi®, Bluetooth®, and/or cellular data interfaces). In certain implementations, the computing device 402 may communicate with the access point 432 using a wired network interface, and one or more of the computing devices 406, 408, 410 may communicate with the access point 432 using a wireless network interface. In certain implementations, the computing device 402 may be collocated with the access point 432 (e.g., may be located within 1-5 feet of the access point 432).

In certain implementations, the computing devices 406, 408, 410 may access, via the access point 432, one or more services provided by the computing device 402. For example, the computing device 402 includes a host agent 412 and containers 420, 422, 424. The containers 420, 422, 424 implement applications 426, 428, 430. The host agent 412 may be configured to provision one or more services to requesting computing devices 406, 408, 410. In particular, requested applications 426, 428, 430 may be implemented within one or more containers 420, 422, 424 executing on the computing device 402. For example, the containers 420, 422, 424 may be provisioned with portions of hardware from the computing device 402 (e.g., CPU/GPU cores, CPU/GPU available time, storage capacity, memory capacity), and the corresponding applications 426, 428, 430 may execute within the containers 420, 422, 424 using the provisioned hardware. In particular, the computing device 402 may receive a request to execute a particular application from one of the computing devices 406, 408, 410, and the host agent 412 may instantiate a corresponding container that implements the requested application.

The applications 426, 428, 430 may include various types of computing processes and computing applications. In certain implementations, the application 426, 428, 430 may include one or more gaming applications, entertainment applications, communication applications, and productivity applications. Gaming applications may include executing video game programs on behalf of the computing devices 406, 408, 410 and may also include other video game-related services, such as video game platforms to purchase, download, and/or update video games. Entertainment applications may include one or more of video streaming applications, video downloading applications, audio streaming applications, audio downloading applications, and the like.

Communication applications may include one or more teleconferencing applications, video conferencing applications, e-mail applications, messaging applications, and the like. Productivity applications may include one or more of word processing applications, data processing applications, task management applications, development environments, and the like. One skilled in the art will appreciate that various types of applications 426, 428, 430 may be implemented within containers 420, 422, 424 executing on the computing device 402.

The computing devices 406, 408, 410 include client access agents 414, 416, 418. In certain implementations, interactions between the computing devices 406, 408, 410 and the computing device 402 may occur via the client access agents 414, 416, 418. The client access agents 414, 416, 418 may be programs executing on the computing devices 406, 408, 410 that communicate with the host agent 412 to control execution (e.g., begin execution, stop execution, pause execution, resume execution) of applications 426, 428, 430 by the computing device 402 on behalf of the computing devices 406, 408, 410. The client access agents 414, 416, 418 may also receive data from the computing device 402 (e.g., via host agent 412) during execution of requested applications 426, 428, 430. For example, video data and/or audio data from an application 426, 428, 430 (e.g., a gaming application) may be streamed to a requesting computing device 406, 408, 410 via the client access agents 414, 416, 418. Furthermore, additional commands or inputs may be received from the computing devices 406, 408, 410 during execution of the applications 426, 428, 430. For example, the client access agents 414, 416, 418 may also receive commands from a user and may transmit the commands to the computing device 402 (e.g., video game inputs). In certain implementations, client access agents 414, 416, 418 may also enable user switching of associated devices. In certain implementations, client access agents 414, 416, 418 may enable users to select and resume certain computing sessions on the computing device 402. For example, a user may initiate execution of the application 426 via the computing device 406 and may switch to the computing device 408 (e.g., when transitioning between gaming environments). In such instances, the client access agents 414, 416, 418 may communicate with the host agent 412 to pause execution of the application 426 (e.g., via the client access agent 414) and to resume execution of the application 426 (e.g., via client access agent 416) once the user has switched computing devices.

In certain implementations, the computing device 402 may implement various applications 426, 428, 430 without being requested to by one of the computing devices 406, 408, 410. For example, the host agent 412 may be configured to provide one or more of user management services, container management services, application updating services, subscription management services, guest management services, and/or user presence detection services. Similarly, the computing device 402 may be configured to implement one or more platform integration services, social presence and communication services, video game library aggregation services, video game launching services, streaming management services, content installation management and update management services, settings management services, account management services, and/or telemetry/statistics collection and analytics services. In certain implementations, the computing device 402 may perform one or more networking services for the access point 432. For example, the computing device 402 may execute one or more networking services to improve the quality of networking services provided to the computing devices 406, 408, 410 by the access point 432. In certain implementations, the computing device 402 may execute one or more voice command services to receive and process voice commands from one or more users (e.g., from one of the computing devices 406, 408, 410). For example, voice commands may be received to control execution of applications 426, 428, 430 (e.g., to begin, pause, and resume execution of gaming applications).

In certain implementations, the computing device 402 may additionally execute applications 426, 428, 430 that are not on behalf of other computing devices 406, 408, 410 (e.g., within containers and/or separate from containers). For example, the computing device 402 may be coupled to a display and may be configured to present results of the applications 426, 428, 430 via the display. In one particular implementation, the computing device 402 may be used as a local gaming device, executing gaming applications for presentation via the display. In certain implementations, the computing device 402 may be configured to simultaneously serve as a local gaming device and to execute applications 426, 428, 430 on behalf of other computing devices 406, 408, 410.

The computing devices 402, 404, 406, 408 may also include processors and memories (not depicted). The processors and memories may implement one or more aspects of the computing devices 402, 404, 406, 408. For example, the memories may store instructions which, when executed by the processors, may cause the processors to perform one or more operational features of the computing devices 402, 404, 406, 408. The processors may be implemented as one or more central processing units (CPUs), field programmable gate arrays (FPGAs), and/or graphics processing units (GPUs) configured to execute instructions stored on the memory.

Figure 5:
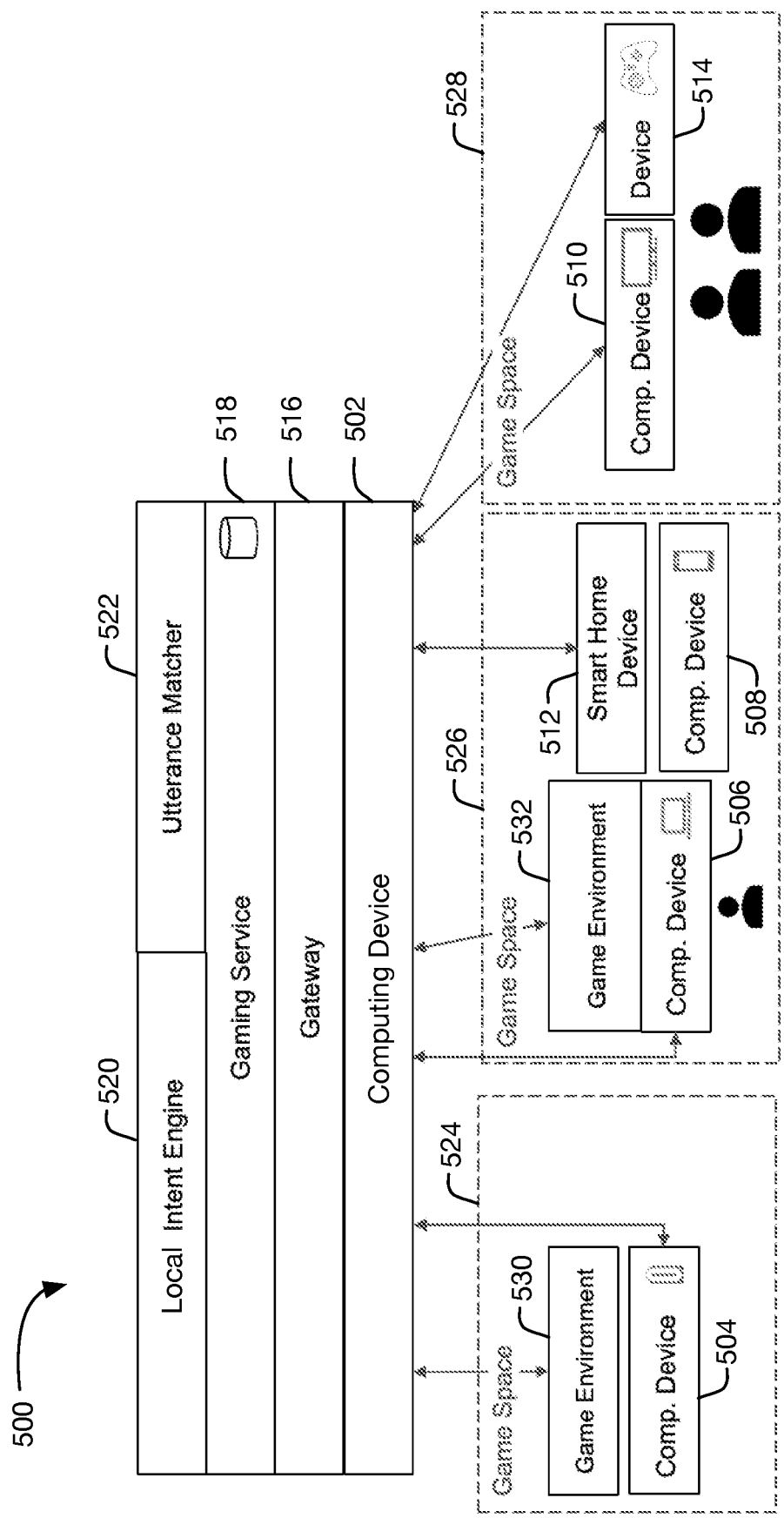
FIG. 5 depicts a system according to an exemplary embodiment of the present disclosure.

FIG. 5 depicts a system 500 according to an exemplary embodiment of the present disclosure. The system 500 may be configured to receive and process verbal requests from one or more users, such as one or more users located in various game spaces 524, 526, 528. The system 500 includes a computing device 502, which may be configured to receive and process verbal requests from users located within the game spaces. In particular, the game spaces 524, 526, 528 include computing devices 504, 506, 508, 510, 512, 514. For example, the game spaces 524, 526, 528 may be exemplary implementations of the environments 204A-C and/or the rooms 202A-E. The computing devices 504, 506, 508, 510, 512 may receive voice commands from one or more users located within the game spaces 524, 526, 528. For example, the computing devices 504, 506, 508, 510, 512, 514 may record audio of a user making a verbal request and may transmit the audio to the computing device 502 for further processing. The computing devices may include one or more gaming consoles (e.g., computing device 504), laptop computers (e.g., computing device 506), smartphones (e.g., computing device 508), televisions (e.g., computing device 510), smart home speakers, smart home devices (e.g., computing device 512), gaming devices such as controllers (e.g., computing device 514), and/or any other type of computing device (e.g., personal computing device, professional computing device). Certain computing devices 504, 506 may implement gaming environments 530, 532, which may locally execute video games on the computing devices 504, 506. In certain implementations, the computing devices 504, 506, 508, 510, 512, 514 may access game environments implemented by other computing devices, such as the computing device 502. For example, the computing device 502 may be an exemplary implementation of the computing device 402, and one or more game environments may execute within containers of the computing device 502. In certain implementations, the voice commands received from users may include requests to control applications executing on the computing devices 504, 506, 508, 510, 512, 514 and/or executing on the computing device 502. For example, a user may request that a video game begin executing on a particular computing device (e.g., a nearby computing device). Additionally or alternatively, the user may request that one or more other computing services be provided (e.g., by the computing device 502, one of the computing devices 504, 506, 508, 510, 512, 514 within a corresponding game space 524, 526, 528, and/or another computing device).

The computing device 502 may be configured to receive and process voice commands received by the computing devices 504, 506, 508, 510, 512, 514. In particular, the computing device 502 may be configured to receive and locally process voice commands such that data concerning the voice requests are not transmitted outside of a network containing the computing devices 502, 504, 506, 508, 510, 512, 514 (e.g., or to minimize the frequency of such external requests). The computing device 502 includes a gateway 516 and a gaming service 518. The gateway 516 may be responsible for network communication and other services. For example, the computing device 502 may be a local gaming device or other personal computing device responsible for providing one or more services (e.g., voice request processing services) for the computing devices 504, 506, 508, 510, 512, 514. For example, the computing device 502 may be an exemplary implementation of the computing device 402. The gateway 516 may accordingly coordinate communication between the computing device 502 and the computing devices 504, 506, 508, 510, 512, 514. The gateway 516 may further implement a gaming service 518 which may provide one or more gaming services to requesting computing devices 504, 506, 508, 510, 512, 514. For example, the gaming service 518 may be an exemplary implementation of a gaming application provided by the computing device 402. In certain implementations, the gaming service 518 may be configured to receive and process voice requests concerning video games and/or other types of applications. Accordingly, the gaming service 518 may include a local intent engine 520 and an utterance matcher 522.

Figure 6:
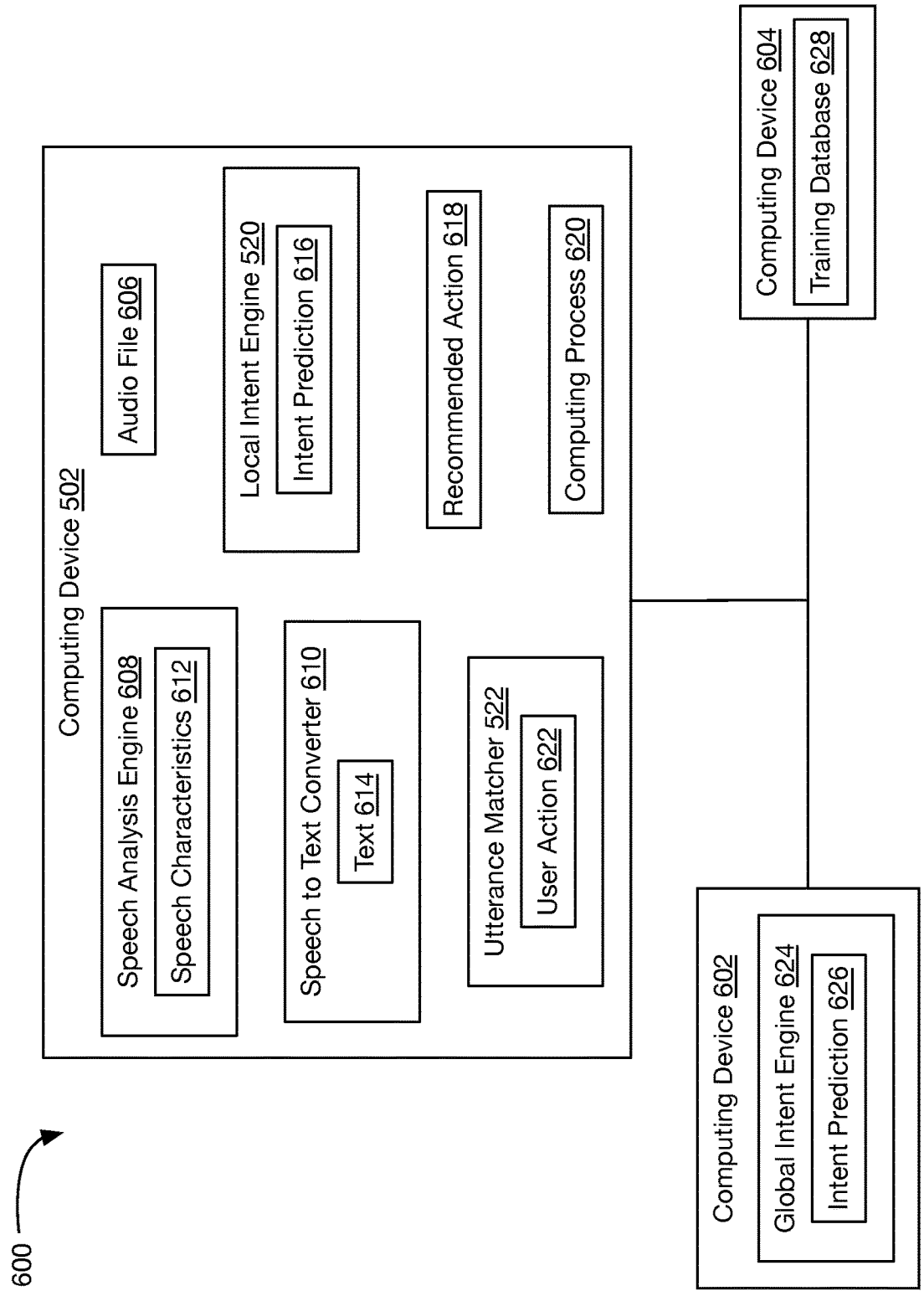
FIG. 6 depicts a system according to an exemplary embodiment of the present disclosure.

The operations of the computing device 502 and in particular of the local intent engine 520 and the utterance matcher 522 are described in greater detail in FIG. 6, which depicts a system 600 according to an exemplary embodiment of the present disclosure. The system 600 may be configured to receive and process voice requests for a user. For example, the system 600 may be an exemplary embodiment of all or part of the system 500. In particular, the system 600 includes the computing device 502. The system 600 also includes computing devices 602, 604.

The computing device 502 includes an audio file 606, a speech analysis engine 608, a speech to text converter 610, a local intent engine 520, a recommended action 618, an utterance matcher 522, a computing process 620, and a global intent engine 624.

The computing device 502 may be configured to receive audio data containing a voice request from a user. In particular, the computing device 502 may receive an audio file 606 containing a recording of a user making a voice request. The computing device 502 may be a local computing device. For example, the computing device 502 may be the computing device that originally captured the audio file 606. Additionally or alternatively, the computing device 502 may be local to another computing device that captured the audio file 606. For example, the computing device 502 may be located within the same premises as the computing device that captured the audio file 606 and/or may be located on the same network (e.g., a local network) as the computing device that captured the audio file 606. In additional or alternative implementations, the computing device 502 may be located within the same premises as the user.

The computing device 502 may be configured to identify a recommended action 618 based on the voice request within the audio file 606, and to execute a computing process 620 corresponding to the recommended action 618. To do so, the computing device 502 may identify a user intent based on the audio file 606. In particular, the computing device 502 may be configured to generate an intent prediction 616 using a local intent engine 520.

To generate the intent prediction 616, the computing device 502 may utilize a speech to text converter 610 to generate a text 614 based on the contents of the audio file 606. In particular, the text 614 may be generated to contain a transcription of the voice request contained within the audio file 606 (e.g., of all or part of the audio file 606). The speech to text converter 610 may be implemented as a machine learning model configured to generate transcriptions of received audio files. In certain implementations, the computing device 502 may further utilize a speech analysis engine 608 to identify speech characteristics 612 based on the audio file 606 and/or the text 614. In certain implementations, the speech characteristic 612 may reflect characteristics of a requesting user's voice while making the voice request contained within the audio file 606 (e.g., volume, tone, cadence, and the like). Additionally or alternatively, the speech characteristics 612 may contain information regarding the contents of the text 614 (e.g., semantics, word choice, and the like).

The local intent engine 520 may then receive one or both of the text 614 and the speech characteristics 612 and may generate the intent prediction 616 based on the received information. The intent prediction 616 may include an identified user intent and a confidence measure for the identified user intent. The user intent may include one or more actions to be taken on behalf of the user. In particular, the intent may include one or more computing processes 620 to be executed by a computing device (e.g., the computing device 504, 506, 508, 510, 512, 514 receiving the request, a local computing device 502, and/or another computing device). For example, the user intent may indicate that a computing process 620 should be executed to launch an application, such as a video game, submit a request, make a purchase, and the like.

In certain implementations, the local intent engine 520 may be configured to generate local intent predictions 616 based on previous requests received from the user. In certain implementations, the local intent engine 520 may be a machine learning model that was trained based on previous requests received by the first computing device 502. For example, the local intent engine 520 may be an updated version of a general intent prediction model that has been trained on a broad collection from training data (e.g., verbal requests received from multiple users in multiple locations). In particular, the local intent engine 520 may be a version of the general intent prediction model that has been additionally trained based on requests received by the computing device 502 to better respond to local requests (e.g., to better account for different types of requests received by the computing device 502, different vocal characteristics of common users of the computing devices 502, 504, 506, 508, 510, 512, 514).

The computing device 502 may be configured to determine, based on the local intent predictions 616, a corresponding computing process 620. In particular, if the confidence measure for the intent prediction 616 exceeds a predetermined threshold (e.g., 50%, 60%, 70%, 80%, 90%), the computing device 502 may identify a recommended action 618 for the computing device 502 (or another computing device) to perform based on the intent. The recommended action 618 may identify a desired goal or outcome to be performed by the computing device 502. For example, the intent prediction may indicate that the user intent is to play a particular video game. The recommended action 618 may then be to launch the requested video game. In certain implementations, more than one recommended action 618 may be identified for a particular user intent. For example, the user may be located in the game space 528 and, in addition to launching the requested video game on the computing device 502, the recommended action 618 may include streaming the game to the computing device 510. In certain implementations, recommended actions 618 may be identified based on a predefined mapping (e.g., an action intent mapping 704, discussed further below). A computing process 620 may then be identified based on the recommended action 618. For example, the computing device 502 may include a library of computing processes that are performed based on corresponding recommended actions 618. For example, the computing device 502 may execute a first computing process 620 that will create a container for the requested video game and begin executing the video game within the container and may execute a second computing process 620 to establish a video stream between the computing devices 502, 510.

The computing device 502 may then execute (or cause another computing device to execute) the computing process 620. In certain implementations, the computing device 502 may itself execute the computing process 620 (e.g., to create a container and begin executing an application). In additional or alternative implementations, the computing device 502 may cause another computing device to execute the computing process 620. The executing computing device may be located near the computing device 502. For example, the computing device 502 may transmit a command to a connected gaming console (e.g., computing device 504) to begin executing a requested video game. In other instances, the executing computing device may be remote from the computing device 502. For example, the computing device 502 may transmit a command to a server computing device that is not on the same local network as the computing device 502 requesting that the server computing device execute a computing process 620 to complete a transaction (e.g., to process payment).

In certain instances, the local intent prediction 616 may not be accurate enough for use in determining the recommended action 618 or the computing process 620. For example, the computing device 502 may determine that the first confidence measure is less than the predetermined threshold. In such instances, the computing device 502 may utilize a global intent engine 624. In particular, the computing device 502 may be configured to determine, using a global intent engine 624 executing on a second computing device 602, a global intent prediction 626 based on the voice request. In certain implementations, the global intent engine 624 may be a machine learning model that is trained based on previous requests received by a plurality of computing devices. For example, the global intent engine may be a generalized machine learning model trained to determine intent predictions based on verbal requests from multiple users in multiple locations. In certain instances, the local intent engine 520 may be a specialized version of the global intent engine 624. The global intent prediction 626 may include a predicted intent of the user indicated by the voice request and a confidence measure for the predicted intent. In certain implementations, rather than being implemented by another computing device 602, the computing device 502 may implement the global intent engine 624.

The computing device 602 may receive the global intent prediction 626 and may determine the recommended action 618 and/or the computing process 620 based on the global intent prediction. For example, the computing device 502 may determine that the confidence measure is greater than or equal to a predetermined threshold (e.g., the same predetermined threshold used for the local intent prediction 616, a different predetermined threshold). In certain implementations, the threshold used for the global intent prediction 626 may be higher than the threshold used for the local intent prediction 616. If the confidence measure is greater than or equal to the predetermined threshold, the computing device 502 may identify the corresponding computing process 620 as corresponding to the user intent contained within the global intent prediction 626. For example, the computing device 502 may select the recommend action 618 and/or the computing process 620 based on the global intent prediction 626 using similar techniques to those described above in connection with selecting based on the local intent prediction 616. The computing device 502 may then execute, or cause another computing device to execute, the computing process 620, as explained above.

In certain instances, the computing device 502 may determine that the second confidence measure is less than the predetermined threshold. In such instances, the computing device 502 may be configured to request additional user input to indicate the recommended action 618 and/or the computing process 620. In particular, the computing device 502 may present a notification to a user (e.g., a verbal notification, a system notification, a communication message) indicating to the user that their request could not be processed and may ask the user to perform the requested task. The computing device 502 may then monitor the user's actions (e.g., using the computing device 502 or another computing device 504, 506, 508, 510, 512, 514 that the user is interacting with) to identify a user action 622.

One or both of the local intent engine 520 and the global intent engine 624 may be updated based on the user action 622. For example, the local intent engine 520 and/or the global intent engine 624 may be updated based on training data stored in a training database 628 (which may be implemented by a separate computing device 604 and/or one of the computing device 502, 602). In such instances, the user action 622, the text 614, the speech characteristics 612, and/or the audio file 606 may be stored in association with one another as training data within the training database 628. In certain instances, separate training databases 628 may be maintained for the global intent engine 624 and the local intent engine 520. For example, a training database for the global intent engine 624 may include training data for requests received from many computing devices in different locations. As another example, a training database for the local intent engine 520 may only include training data from requests received by the collocated computing devices 502, 504, 506, 508, 510, 512, 514 and/or for requests received from one or more specified users.

Figure 7:
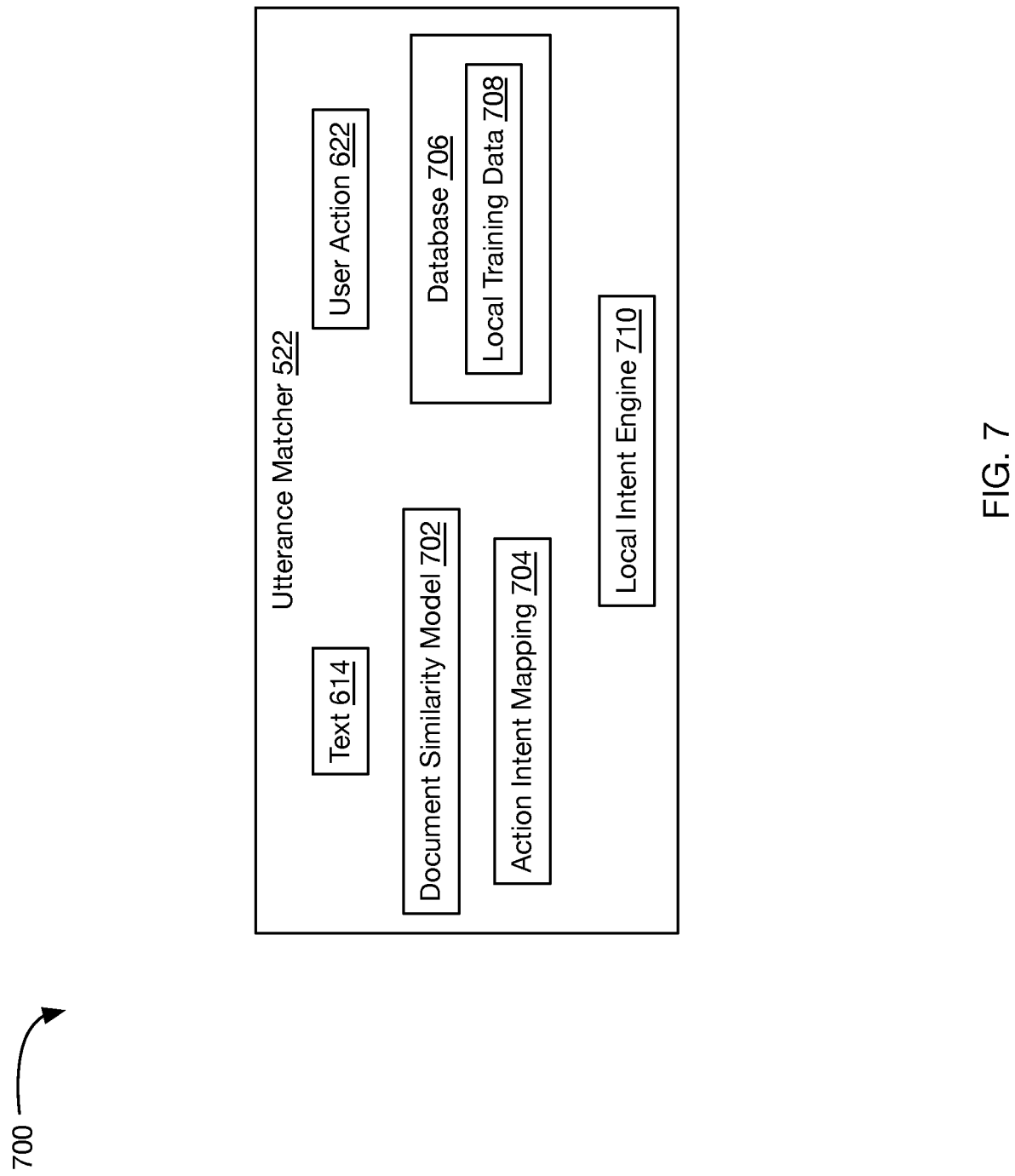
FIG. 7 depicts a system according to an exemplary embodiment of the present disclosure.

In particular, the intent engines 520, 624 may be updated by the utterance matcher 522. For example, FIG. 7 which depicts a system 700 according to an exemplary embodiment of the present disclosure. The system 700 may depict an exemplary implementation of the utterance matcher 522. The utterance matcher 522 may receive the text 614 (e.g., from the computing device) and may receive the user action 622 (e.g., from a user and/or from a monitoring computing device). The utterances matcher 522 also includes a document similarity model 702, an action intent mapping 704, a database 706, and the local intent engine 520. The database 706 includes local training data 708.

The document similarity model 702 may be a model that matches particular user intents to different verbal requests (e.g., texts 614 generated based on verbal requests). For example, the document similarity model 702 may be a machine learning model trained to predict corresponding intents based on received texts. In certain implementations, the document similarity model 702 may be a part of the local intent engine 520. In certain implementations, the document similarity model 702 may be trained to recognize a predetermined list or collection of user intents. For example, the document similarity model 702 may store a plurality of example texts in association with corresponding, predetermined user intents. The document similarity model 702 may then identify a predicted user intent based on a received text 614 as the user intent that corresponds to the example text that is most similar to the received text 614. In such instances, a confidence measure for the intent predictions 616, 626 may be less than the predetermined thresholds because the user's intent in a received verbal request is not included in the predetermined list. The utterance matcher 522 may determine that a new intent needs to be added to the document similarity model 702 if the user action 622 does not correspond to one of the predetermined user intents. In such instances, the utterance matcher 522 may add a new user intent corresponding to the user action 622 to the document similarity model 702 and may store the text 614 as an example text corresponding to the new user intent.

The action intent mapping 704 may store corresponding recommended actions 618 and/or computing processes 620 in association with user intents that may be identified by the document similarity model 702. For example, each of the predetermined list of user intents may be included within the action intent mapping 704 with one or more corresponding actions 618 and/or computing processes 620. When a new user intent is added to the document similarity model 702, a corresponding entry may be added to the action intent mapping 704. For example, after adding the new user intent based on the user action 622, the user action 622 itself (e.g., what actions or computing processes a user took) may be added to the action intent mapping 704 as well.

The local intent engine 520 may then be updated based on the user action 622 and the text 614. In particular, the text 614 may be added to local training data 708 used to train the local intent engine 520. Where the user action 622 corresponds to a new user intent, the text 614 may be added as corresponding to the new user intent. Where the user action 622 corresponds to an existing user intent, the text 614 may be added as corresponding to the existing user intent. In certain instances, the database 706 storing the local training data 708 may be implemented by the computing device 502 and/or by another computing device. The local intent engine 520 may then be trained based on the new local training data 708. For example, the local intent engine 520 may be trained after each received text 614, and user action 622 and/or may be trained at regular intervals.

Similar processes may be used to update the global intent engine 624. For example, although not depicted, the global intent engine 624 may include its own utterance matcher, which may be separate from the utterance matcher 522. For example, the computing device 602 (or another computing device) may maintain a separate utterance matcher (e.g., a global utterance matcher) for the global intent engine 624 that includes similar elements to the utterance matcher 522. In particular, the global utterance matcher may receive the text 614 and the user action 622 and may include a document similarity model, action intent mapping, the global intent engine 624, and may maintain a database that includes global training data for the global intent engine 624. The document similarity model and the action intent mapping may be updated based on the text 614 and the user action 622, similar to the document similarity model 702 and the action intent mapping 704. Similarly, the global training data may be updated based on the text 614 and the user action 622. In certain instances, the global utterance matcher may receive many texts and corresponding user actions, which may be grouped (e.g., based on similar texts and/or similar text messages) before updating the global intent engine 624.

As noted above, the local intent engine 520, global intent engine 624, and/or document similarity models 702 may be implemented as one or more machine learning models, including supervised learning models, unsupervised learning models, other types of machine learning models, and/or other types of predictive models. For example, the local intent engine 520, global intent engine 624, and/or document similarity models 702 may be implemented as one or more of a neural network, a decision tree model, a support vector machine, a Bayesian network, a classifier model, a regression model, and the like. The local intent engine 520, global intent engine 624, and/or document similarity models 702 may be trained based on training datasets that specify one or more expected outputs (e.g., expected user intents, expected similar texts). Parameters of the local intent engine 520, global intent engine 624, and/or document similarity models 702 may be updated based on whether the local intent engine 520, global intent engine 624, and/or document similarity models 702 generate correct outputs when compared to the expected outputs. In particular, the local intent engine 520, global intent engine 624, and/or document similarity models 702 may receive one or more pieces of input data from the training data sets that are associated with a plurality of expected outputs. The local intent engine 520, global intent engine 624, and/or document similarity models 702 may generate predicted outputs based on a current configuration of the local intent engine 520, global intent engine 624, and/or document similarity models 702. The predicted outputs may be compared to the expected outputs and one or more parameter updates may be computed based on differences between the predicted outputs and the expected outputs. In particular, the parameters may include weights (e.g., priorities) for different features and combinations of features (e.g., textual features, semantic features). The parameter updates for the local intent engine 520, global intent engine 624, and/or document similarity models 702 may include updating one or more of the features analyzed and/or the weights assigned to different features or combinations of features (e.g., relative to the current configuration of the local intent engine 520, global intent engine 624, and/or document similarity models 702).

Many of the examples discussed above focus on voice requests to begin executing or control execution of one or more applications (e.g., gaming applications). One skilled in the art will appreciate that similar techniques can be used to improve the performance of additional or alternative types of voice requests. For example, additional or alternative voice requests may include purchasing products or services, processing payment, controlling one or more smart home devices, interacting with one or more computing services, controlling media playback, and the like. All such additional or alternative voice requests are accordingly considered within the scope of the present disclosure.

Figure 8:
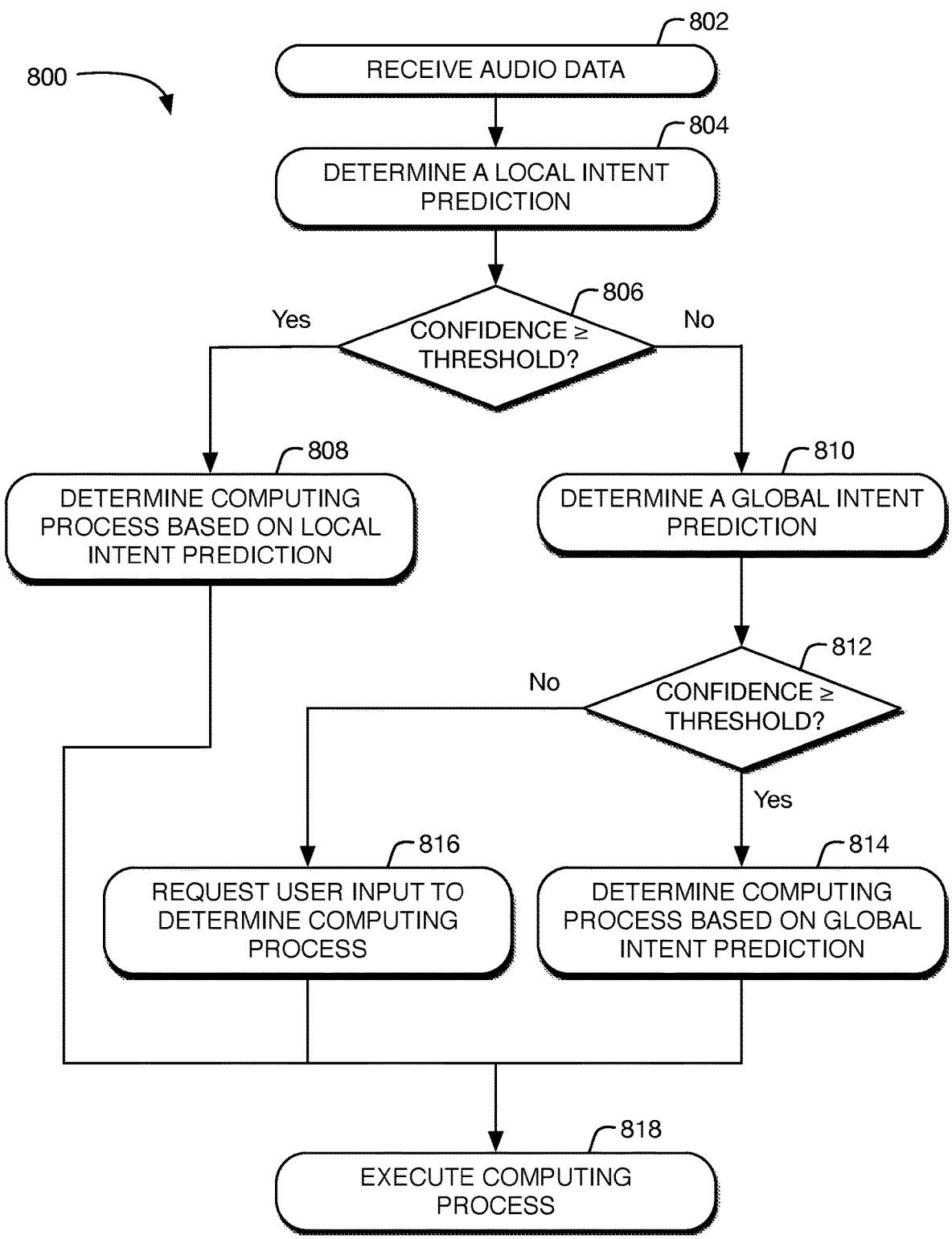
FIG. 8 depicts a block diagram of a method 800 according to an exemplary embodiment of the present disclosure.

FIG. 8 depicts a block diagram of a method 800 according to an exemplary embodiment of the present disclosure. The method 800 may be performed to process audio data for user requests. The method 800 may be implemented on a computer system, such as the system 500, 600. For example, the method 800 may be implemented by the computing devices 502, 602, 604. The method 800 may also be implemented by a set of instructions stored on a computer readable medium that, when executed by a processor, cause the computing device to perform the method 800. Although the examples below are described with reference to the flowchart illustrated in FIG. 8, many other methods of performing the acts associated with FIG. 8 may be used. For example, the order of some of the blocks may be changed, certain blocks may be combined with other blocks, one or more of the blocks may be repeated, and some of the blocks may be optional.

The method 800 includes receiving audio data (block 802). For example, the computing device 502 may receive audio data (e.g., an audio file 606). The audio data may contain a voice request from a user. The computing device 502 may be (e.g., located near a requesting user, on the same local network as a computing device that recorded the audio data).

The method 800 includes determining a local intent prediction (block 804). For example, the computing device 502 may determine a local intent prediction 616 based on the voice request within the audio data. The local intent prediction 616 may be determined using a local intent engine 520 executing on the first computing device 502. In particular, a text 614 containing the voice request (e.g., a transcript of the words spoken during the voice request) may be generated (e.g., using a speech to text converter 610). The text 614 may then be provided to the local intent engine 520 for use by the local intent engine 520 in determining the local intent prediction 616.

The method 800 includes determining whether a confidence measure for the local intent prediction exceeds a threshold (block 806). For example, the computing device 502 may determine whether a confidence measure of the local intent prediction 616 exceeds a predetermined threshold (e.g., a local confidence threshold). In certain implementations, the local intent prediction 616 may identify a user intent reflected within the voice request and/or a confidence measure (e.g., a first confidence measure) for the user intent. In certain implementations, the user intent may include one or more actions to be taken on behalf of the user. In certain implementations, the first confidence measure represents a predicted likelihood that the first predicted intent accurately reflects an intent of the user.

If the confidence measure exceeds the threshold, the method 800 includes determining a computing process based on the local intent prediction (block 808). For example, the computing device 502 may determine that a computing process 620 based on the local intent prediction 616. In certain instances, the computing device 502 may identify a recommended action 618 based on the user intent identified within the local intent prediction 616 (e.g., according to an action intent mapping 704), and the computing process 620 may be identified based on the recommended action 618.

If the first confidence measure is less than the predetermined threshold, the method 800 includes determining a global intent prediction 626 (block 810). For example, the computing device 502 may determine, using a global intent engine 624, a global intent prediction 626 based on the voice request. The global intent engine 624 may execute on another computing device 602 and/or may execute on the computing device 502. In certain implementations, the global intent engine 624 may be a machine learning model that is trained based on previous requests received by multiple computing devices in multiple locations. The computing device 502 may provide the global intent engine 624 with the text 614 of the voice request, and the global intent engine may be configured to generate the global intent prediction 626 based on the text 614.

The method 800 includes determining whether a confidence measure for the global intent prediction exceeds a threshold (block 812). For example, the computing device 502 may determine whether a confidence measure of the global intent prediction 626 exceeds a predetermined threshold (e.g., a global confidence threshold). In certain implementations, the global intent prediction 626 may identify a user intent reflected within the voice request and/or a confidence measure (e.g., a second confidence measure) for the user intent. In certain implementations, the user intent may include one or more actions to be taken on behalf of the user. In certain implementations, the second confidence measure represents a predicted likelihood that the predicted intent accurately reflects an intent of the user.

If the confidence measure for the global intent prediction is greater than or equal to the predetermined threshold, the method 800 includes identifying a corresponding computing process based on the global intent prediction (block 814). For example, the computing device 502 may identify the corresponding computing process 620 based on the global intent prediction 626. In certain instances, the computing device 502 may identify a recommended action 618 based on the user intent identified within the global intent prediction 626 (e.g., according to an action intent mapping), and the computing process 620 may be identified based on the recommended action 618.

If the confidence measure for the global intent prediction is less than the predetermined threshold, the method 800 includes requesting additional user input to indicate the corresponding computing process (block 822). For example, the computing device 502 may request additional user input to indicate the corresponding computing process 620. In particular, the computing device 502 (e.g., the utterance matcher 522) may monitor one or more user actions 622 after requesting user input. The user actions 622 may request or otherwise identify a computing process 620 to be performed (e.g., by receiving a command from a user to execute a particular computing process or perform a particular action). As explained further above, one or both of the local intent engine 520 and the global intent engine 624 may be updated based on the user action 622 and the text 614.

The method 800 includes executing the corresponding computing process (block 824). For example, the computing device 502 may execute the corresponding computing process 620 identified at block 808, block 814, and/or block 816. In certain implementations, the corresponding computing process 620 may be executed by the first computing device 502. In additional or alternative implementations, the computing process 620 may be performed at least in part by another computing device.

The method 800 accordingly enables a hybrid processing of voice requests received from users that utilizes both local and global processing of received requests. By processing as many voice requests as possible locally, the method 800 may improve privacy by limiting the number of requests that are sent to external computing devices for processing. Further, local processing of voice requests may reduce processing delays (e.g., caused by communications between local devices and external devices). Local processing may also reduce the network bandwidth requirement for processing voice requests, as queries are not made (and thus data is not sent) to external devices unless needed (e.g., for low-confidence intent predictions). The local intent matcher may also be better tuned or configured to an individual user's style or type of requests based on the received requests and associated training, which may represent an improvement over global, general purpose models for multiple users. However, the hybrid approach described by the method 800 may still capture the benefits of such a global intent manager as needed when local intent predictions are not accurate enough.

Figure 9:
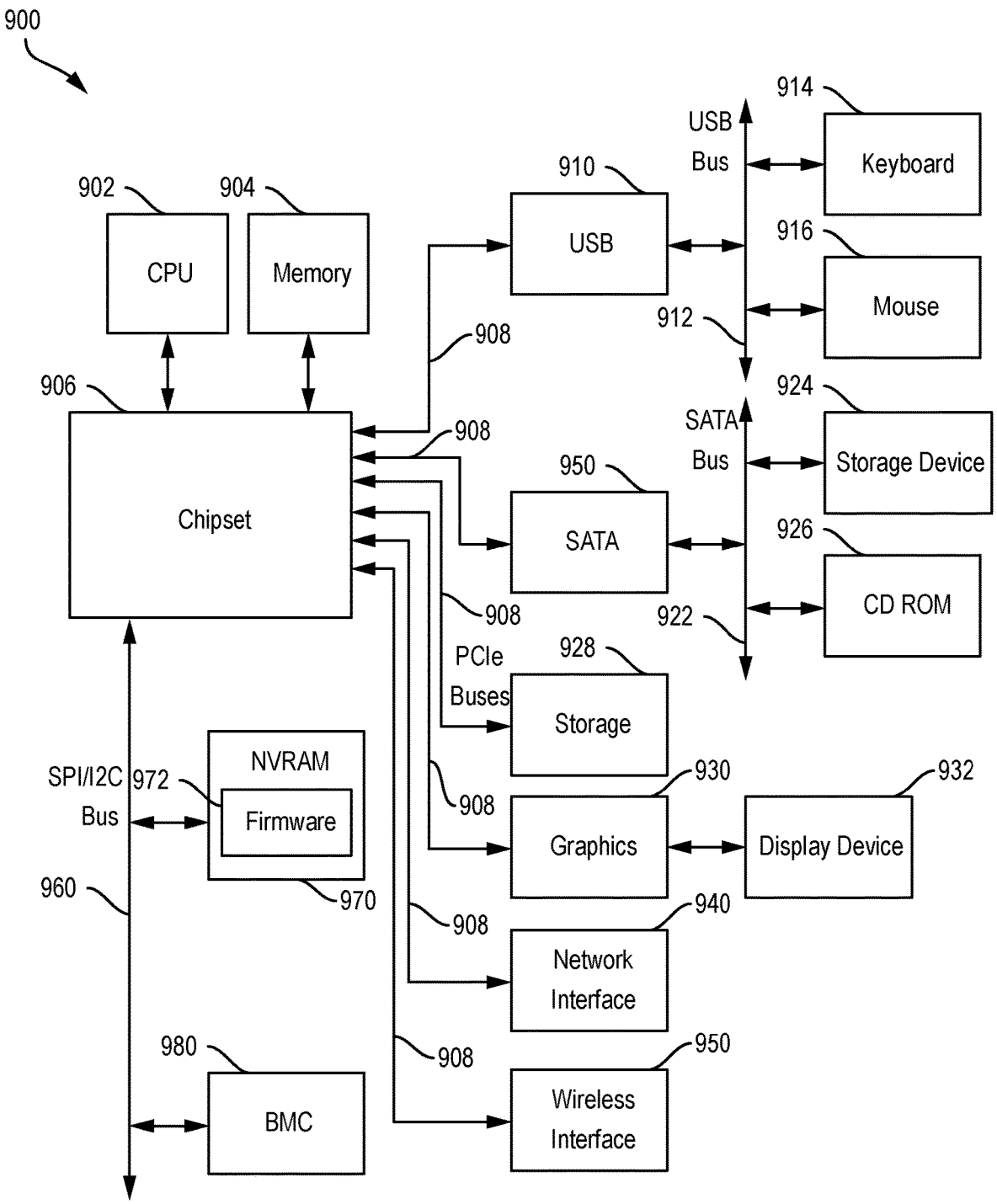
FIG. 9 is a schematic block diagram of an example information handling system according to some embodiments of the disclosure.

FIG. 9 illustrates an example information handling system 900.

Information handling system 900 may include a processor 902 (e.g., a central processing unit (CPU)), a memory (e.g., a dynamic random-access memory (DRAM)) 904, and a chipset 906. In some embodiments, one or more of the processor 902, the memory 904, and the chipset 906 may be included on a motherboard (also referred to as a mainboard), which is a printed circuit board (PCB) with embedded conductors organized as transmission lines between the processor 902, the memory 904, the chipset 906, and/or other components of the information handling system. The components may be coupled to the motherboard through packaging connections, such as a pin grid array (PGA), ball grid array (BGA), land grid array (LGA), surface-mount technology, and/or through-hole technology. In some embodiments, one or more of the processor 902, the memory 904, the chipset 906, and/or other components may be organized as a System on Chip (SoC).

The processor 902 may execute program code by accessing instructions loaded into memory 904 from a storage device, executing the instructions to operate on data that has also been loaded into memory 904 from a storage device, and generate output data that is stored back into memory 904 or sent to another component. The processor 902 may include processing cores capable of implementing any of a variety of instruction set architectures (ISAs), such as the x86, POWERPC®, ARM®, SPARC®, MIPS® ISAs, or any other suitable ISA. In multi-processor systems, each of the processors 902 may commonly, but not necessarily, implement the same ISA. In some embodiments, multiple processors may each have different configurations, such as when multiple processors are present in a big-little hybrid configuration with some high-performance processing cores and some high-efficiency processing cores. The chipset 906 may facilitate the transfer of data between the processor 902, the memory 904, and other components. In some embodiments, chipset 906 may include two or more integrated circuits (ICs), such as a northbridge controller coupled to the processor 902, the memory 904, and a southbridge controller, with the southbridge controller coupled to the other components USB 910, SATA 920, and PCIe buses 908. The chipset 906 may couple to other components through one or more PCIe buses 908.

Some components may be coupled to one bus line of the PCIe buses 908, whereas some components may be coupled to more than one bus line of the PCIe buses 908. One example component is a universal serial bus (USB) controller 910, which interfaces the chipset 906 to a USB bus 912. A USB bus 912 may couple input/output components, such as a keyboard 914 and a mouse 916, but also other components such as USB flash drives, or another information handling system. Another example component is a SATA bus controller 920, which couples the chipset 906 to a SATA bus 922. The SATA bus 922 may facilitate efficient transfer of data between the chipset 906 and components coupled to the chipset 906 and a storage device 924 (e.g., a hard disk drive (HDD) or solid-state disk drive (SDD)) and/or a compact disc read-only memory (CD-ROM) 926. The PCIe bus 908 may also couple the chipset 906 directly to a storage device 928 (e.g., a solid-state disk drive (SDD)). A further example of an example component is a graphics device 930 (e.g., a graphics processing unit (GPU)) for generating output to a display device 932, a network interface controller (NIC) 940, and/or a wireless interface 950 (e.g., a wireless local area network (WLAN) or wireless wide area network (WWAN) device), such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 906 may also be coupled to a serial peripheral interface (SPI) and/or an Inter-Integrated Circuit (I2C) bus 960, which couples the chipset 906 to system management components. For example, a non-volatile random-access memory (NVRAM) 970 for storing firmware 972 may be coupled to the bus 960. As another example, a controller, such as a baseboard management controller (BMC) 980, may be coupled to the chipset 906 through the bus 960. BMC 980 may be referred to as a service processor or embedded controller (EC). Capabilities and functions provided by BMC 980 may vary considerably based on the type of information handling system. For example, the term baseboard management system may be used to describe an embedded processor included at a server, while an embedded controller may be found in a consumer-level device. As disclosed herein, BMC 980 represents a processing device different from processor 902, which provides various management functions for information handling system 900. For example, an embedded controller may be responsible for power management, cooling management, and the like. An embedded controller included at a data storage system may be referred to as a storage enclosure processor or a chassis processor.

System 900 may include additional processors that are configured to provide local or specific control functions, such as a battery management controller. Bus 960 can include one or more buses, including a Serial Peripheral Interface (SPI) bus, an Inter-Integrated Circuit (I2C) bus, a system management bus (SMBUS), a power management bus (PMBUS), or the like. BMC 980 may be configured to provide out-of-band access to devices at information handling system 900. Out-of-band access in the context of the bus 960 may refer to operations performed prior to execution of firmware 972 by processor 902 to initialize operation of system 900.

Firmware 972 may include instructions executable by processor 902 to initialize and test the hardware components of system 900. For example, the instructions may cause the processor 902 to execute a power-on self-test (POST). The instructions may further cause the processor 902 to load a boot loader or an operating system (OS) from a mass storage device. Firmware 972 additionally may provide an abstraction layer for the hardware, such as a consistent way for application programs and operating systems to interact with the keyboard, display, and other input/output devices. When power is first applied to information handling system 900, the system may begin a sequence of initialization procedures, such as a boot procedure or a secure boot procedure. During the initialization sequence, also referred to as a boot sequence, components of system 900 may be configured and enabled for operation and device drivers may be installed. Device drivers may provide an interface through which other components of the system 900 can communicate with a corresponding device. The firmware 972 may include a basic input-output system (BIOS) and/or include a unified extensible firmware interface (UEFI). Firmware 972 may also include one or more firmware modules of the information handling system. Additionally, configuration settings for the firmware 972 and firmware of the information handling system 900 may be stored in the NVRAM 970. NVRAM 970 may, for example, be a non-volatile firmware memory of the information handling system 900 and may store a firmware memory map namespace 900 of the information handling system. NVRAM 970 may further store one or more container-specific firmware memory map namespaces for one or more containers concurrently executed by the information handling system.

Information handling system 900 may include additional components and additional buses, not shown for clarity. For example, system 900 may include multiple processor cores (either within processor 902 or separately coupled to the chipset 906 or through the PCIe buses 908), audio devices (which may be coupled to the chipset 906 through one of the PCIe buses 908), or the like. While a particular arrangement of bus technologies and interconnections is illustrated for the purpose of example, one of skill will appreciate that the techniques disclosed herein are applicable to other system architectures. System 900 may include multiple processors and/or redundant bus controllers. In some embodiments, one or more components may be integrated together in an integrated circuit (IC), which is circuitry built on a common substrate. For example, portions of chipset 906 can be integrated within processor 902. Additional components of information handling system 900 may include one or more storage devices that may store machine-executable code, one or more communications ports for communicating with external devices, and various input and output (I/O) devices, such as a keyboard, a mouse, and a video display.

In some embodiments, processor 902 may include multiple processors, such as multiple processing cores for parallel processing by the information handling system 900. For example, the information handling system 900 may include a server comprising multiple processors for parallel processing. In some embodiments, the information handling system 900 may support virtual machine (VM) operation, with multiple virtualized instances of one or more operating systems executed in parallel by the information handling system 900. For example, resources, such as processors or processing cores of the information handling system may be assigned to multiple containerized instances of one or more operating systems of the information handling system 900 executed in parallel. A container may, for example, be a virtual machine executed by the information handling system 900 for execution of an instance of an operating system by the information handling system 900. Thus, for example, multiple users may remotely connect to the information handling system 900, such as in a cloud computing configuration, to utilize resources of the information handling system 900, such as memory, processors, and other hardware, firmware, and software capabilities of the information handling system 900. Parallel execution of multiple containers by the information handling system 900 may allow the information handling system 900 to execute tasks for multiple users in parallel secure virtual environments.

The schematic or flow chart diagrams of FIG. 8 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms, such as Adaboost or stochastic gradient boosting systems for iteratively updating weighting to train a machine learning classifier to determine a relationship between an influencing attribute, such as received device data; a system, such as an environment or particular user; and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks, and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein, may be utilized. Accordingly, the appended claims are intended to include within their scope such processes, machines, manufacture, compositions of matter, means, methods, or steps.

What is claimed is:

1. A method, comprising:
    receiving, at a first computing device, audio data containing a voice request from a user;
    determining, using a local intent engine executing on the first computing device, a local intent prediction based on the voice request;
    determining that a first confidence measure for the local intent prediction is less than a predetermined threshold;
    transmitting data containing the voice request to a global intent engine executing on a second computing device;
    receiving, from the global intent engine, a global intent prediction based on the voice request, wherein the global intent prediction includes (i) a second predicted intent of the user indicated by the voice request and (ii) a second confidence measure for the second predicted intent;
    determining, based on the global intent prediction, a corresponding computing process, wherein determining the corresponding computing process further comprises:
        determining that the second confidence measure is greater than or equal to a predetermined threshold; and
        identifying the corresponding computing process as corresponding to the second predicted intent; and
    executing the corresponding computing process.

2. The method of claim 1, wherein the local intent prediction includes a first predicted intent of the user indicated by the voice request, and wherein the first confidence measure is for the first predicted intent.

3. The method of claim 1,
    wherein the data containing the voice request is transmitted to the global intent engine in response to determining that the first confidence measure is less than the predetermined threshold.

4. The method of claim 1, wherein determining the corresponding computing process further comprises:
    determining that the second confidence measure is less than a predetermined threshold; and
    requesting additional user input to indicate the corresponding computing process.

5. The method of claim 4, further comprising updating, based on the additional user input, at least one of the local intent engine and the global intent engine.

6. The method of claim 1, further comprising, before determining the local intent prediction:
    generating, based on the audio data, a text containing the voice request,
    wherein the text is provided to the local intent engine to determine the local intent prediction.

7. The method of claim 1, wherein the local intent engine is a machine learning model trained based on previous requests received by the first computing device from the user.

8. An information handling system, comprising:
    a memory; and
    a processor coupled to the memory, wherein the processor is configured to perform steps comprising:
        receiving, at a first computing device, audio data containing a voice request from a user;
        determining, using a local intent engine executing on the first computing device, a local intent prediction based on the voice request;
        determining that a first confidence measure for the local intent prediction is less than a predetermined threshold;
        transmitting data containing the voice request to a global intent engine executing on a second computing device;
        receiving, from the global intent engine, a global intent prediction based on the voice request, wherein the global intent prediction includes (i) a second predicted intent of the user indicated by the voice request and (ii) a second confidence measure for the second predicted intent;
    determining, based on the global intent prediction, a corresponding computing process, wherein determining the corresponding computing process further comprises:
        determining that the second confidence measure is greater than or equal to a predetermined threshold; and
        identifying the corresponding computing process as corresponding to the second predicted intent; and
    executing the corresponding computing process.

9. The information handling system of claim 8, wherein the local intent prediction includes a first predicted intent of the user indicated by the voice request, and wherein the first confidence measure is for the first predicted intent.

10. The information handling system of claim 8,
    wherein the data containing the voice request is transmitted to the global intent engine in response to determining that the first confidence measure is less than the predetermined threshold.

11. The information handling system of claim 8, wherein determining the corresponding computing process further comprises:
    determining that the second confidence measure is less than a predetermined threshold; and
    requesting additional user input to indicate the corresponding computing process.

12. A computer program product, comprising:
a non-transitory computer readable medium comprising code which, when executed by a processor, causes the processor to perform steps comprising:
- receiving, at a first computing device, audio data containing a voice request from a user;
- determining, using a local intent engine executing on the first computing device, a local intent prediction based on the voice request;
- determining that a first confidence measure for the local intent prediction is less than a predetermined threshold;
- transmitting data containing the voice request to a global intent engine executing on a second computing device;
- receiving, from the global intent engine, a global intent prediction based on the voice request, wherein the global intent prediction includes (i) a second predicted intent of the user indicated by the voice request and (ii) a second confidence measure for the second predicted intent;
- determining, based on the global intent prediction, a corresponding computing process, wherein determining the corresponding computing process further comprises:
  - determining that the second confidence measure is greater than or equal to a predetermined threshold; and
  - identifying the corresponding computing process as corresponding to the second predicted intent; and
- executing the corresponding computing process.

13. The computer program product of claim 12, wherein the local intent prediction includes a first predicted intent of the user indicated by the voice request, and wherein the first confidence measure is for the first predicted intent.

14. The computer program product of claim 12,
wherein the data containing the voice request is transmitted to the global intent engine in response to determining that the first confidence measure is less than the predetermined threshold.

\* \* \* \* \*